United States Patent
Hoppner et al.

[11] 3,900,258
[45] Aug. 19, 1975

[54] EXPOSURE APPARATUS

[75] Inventors: Werner F. Hoppner, Webster; David K. Shogren, Ontario, both of N.Y.

[73] Assignee: Xerox Corporation, Stamford, Conn.

[22] Filed: June 7, 1973

[21] Appl. No.: 367,996

Related U.S. Application Data

[63] Continuation of Ser. No. 284,687, Aug. 29, 1972, abandoned.

[52] U.S. Cl. ................................. 355/51; 355/8
[51] Int. Cl.² ................ G03B 27/46; G03G 15/04
[58] Field of Search ............ 355/3 R, 8, 11, 47–51, 355/66

[56] References Cited
UNITED STATES PATENTS

| | | | |
|---|---|---|---|
| 3,081,677 | 3/1963 | Limberger | 355/11 |
| 3,221,621 | 12/1965 | Cranskens et al. | 355/11 |
| 3,499,710 | 3/1970 | Sahley | 355/64 |
| 3,833,296 | 9/1974 | Vola et al. | 355/57 X |
| 3,844,654 | 10/1974 | Guenther | 355/24 |

OTHER PUBLICATIONS

T. A. Hoskins et al., "Dual Mode Copying System," IBM Technical Disclosure Bulletin, Vol. 12, No. 1, p. 173.

*Primary Examiner*—Samuel S. Matthews
*Assistant Examiner*—Kenneth C. Hutchison
*Attorney, Agent, or Firm*—James J. Ralabate; Clarence A. Green; Paul Weinstein

[57] ABSTRACT

An apparatus for reproducing stationary or moving originals. The apparatus includes means for providing a flowing light image of a stationary original in a first mode of operation and of a moving original in a second mode of operation and means for selecting between the first mode of operation and the second mode of operation. Preferably the flowing light image of the stationary original is provided by optical scanning means and the flowing light image of the moving original is provided by means for fixing the optical scanning means at a given position and means for feeding the original past the fixed optics. The feeding means preferably comprises a document feeder and means to move the document feeder from the stored position to an operative position so that documents advanced through the feeder are within the viewing domain of the fixed optical scanning means.

16 Claims, 13 Drawing Figures

EXPOSURE APPARATUS

This is a continuation of application Ser. No. 284,687, filed Aug. 29, 1972, now abandoned.

This invention relates to an optical scanning device for providing a compact copier with the ability to automatically reproduce original documents of a relatively large size.

In the copying art, it has been found advantageous to support the original to be reproduced upon a stationary viewing platen while recording an image of the stationary original upon a photosensitive plate. Copies of the original can then be conveniently reproduced from the plate. The use of a flat viewing platen provides a safe and convenient means for supporting relatively bulky items, such as books or the like, and affords the machine operator the freedom to compose an original from many different sources.

In order to automate many copying processes, as for example the xerographic process, the photosensitive plate is generally arranged to move over an endless path of travel through the various processing stations thus requiring that image recording be accomplished while the plate is moving. To this end, movable optical scanning systems such as that disclosed by Rutkus et al in U.S. Pat. No. 3,062,095 have been devised which are capable of creating a flowing light image of a stationary original suitable for recording upon a moving photosensitive element. Although the Rutkus type scanning systems, as evidenced by their wide commercial utilization, have proven quite successful, it nevertheless possesses one inherent drawback in that the size of the original subject matter that can be recorded is confined to the viewing domain of the optics involved. As can be seen, this feature restricts the manner in which the machine can be utilized and is particularly troublesome in the case of the compact or small copier. Heretofore, in order to reproduce a relatively large document employing this type of copier, it was necessary to break the matter subject maatter down into viewable components and, upon the copying of each component, reconstructing the many parts to recreate the original. As can be seen, this practice requires a number of tedious and time consuming manual operations and, because of the human factors involved, generally results in the production of poor quality copy.

It is therefore an object of the present invention to improve xerographic reproducing devices.

It is a further object of the present invention to provide a compact copier having the flexibility of handling large documents.

Another object of the present invention is to increase the flexibility of automatic xerographic reproducing machines to provide the machines with a more complete document handling capability.

These and other objects of the present invention are attained by means of an automatic compact copying machine having a stationary viewing platen of finite dimensions, a moving optical mechanism for scanning across the platen and creating a flowing light image of the original subject matter supported thereon, a movably mounted document feeder normally mounted in a stored position adjacent to the viewing platen wherein the feeder lies outside of the viewing domain of the scanning optics, means to move the document feeder from a stored position to an operative position over the platen within the viewing domain of the scanning optics and means operable by the movement of the document feeder to the operative position to automatically move the scanning optics to a fixed location beneath the document feeder whereby documents advanced therethrough are viewed by the fixed optics so as to create a flowing light image of the original within the image plane of the optical system.

For a better understanding of the invention as well as objects and further features thereof, reference is had to the following detailed description of the invention to be read in connection with the accompanying drawings wherein.

Figure 1:
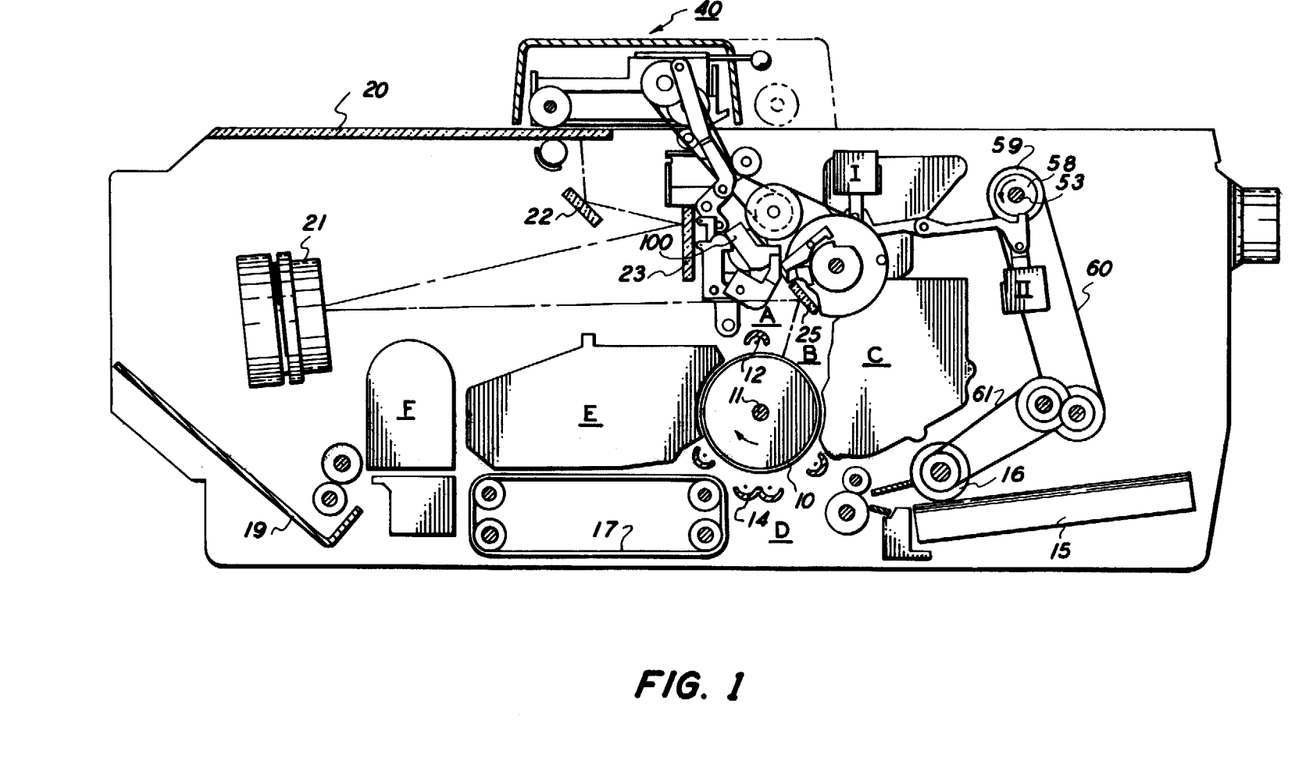
FIG. 1 is a schematic representation of an automatic xerographic compact copier employing the optical system of the present invention.

Referring now to FIG. 1, there is illustrated a schematic plan view of a compact automatic xerographic copying machine incorporating the large document copying mechanism of the present invention. The term compact copier, as herein used, refers to a machine of relatively small size, as for example a desk type copier, having a stationary viewing platen and a moving optical system for scanning original subject matter supported on the platen and creating a flowing or moving light image thereof. Basically, the xerographic processor includes a rotatably mounted photoconductive drum 10 which is supported upon a horizontally extende shaft 11. The drum is driven in the direction indicated whereby the photoconductive surface is caused to pass sequentially through a series of xerographic processing stations.

Because the xerographic process is widely known and used in the art, the various processing steps involved will be briefly explained below in reference to FIG. 1. Initially, the photoconductive drum surface is uniformly charged by means of a corona generator 13 positioned within a charging station A located at approximately the 12 o'clock drum position. The charged drum surface is then advanced into an imaging station wherein a flowing light image of an original document to be reproduced is projected onto the charged drum surface thus recording on the drum a latent electrostatic image containing the original input scene information. Next, subsequent to the exposure step in the direction of drum rotation is a developing station C wherein the latent electrostatic image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a second corona generator 14.

In operation, a supply of cut sheets are supported within the machine by means of a removable paper cassette 15. A pair of feed rollers 16 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference is had to copending U.S. patent application Ser. No. 205,911 filed in the name of Punnett et al.

After transfer, but prior to the reintroduction of the imaged portion of the drum into the charging station, the plate surface is passed through a cleaning station E wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 17 which serves to advance the support sheet into a thermal fusing station F wherein the toner image is permanently fixed to the sheet. The copy sheet with the fused image thereon is forwarded from the fuser into a collecting tray 19 where the sheet is held until such time as the operator has occasion to remove it from the machine.

Figure 2:
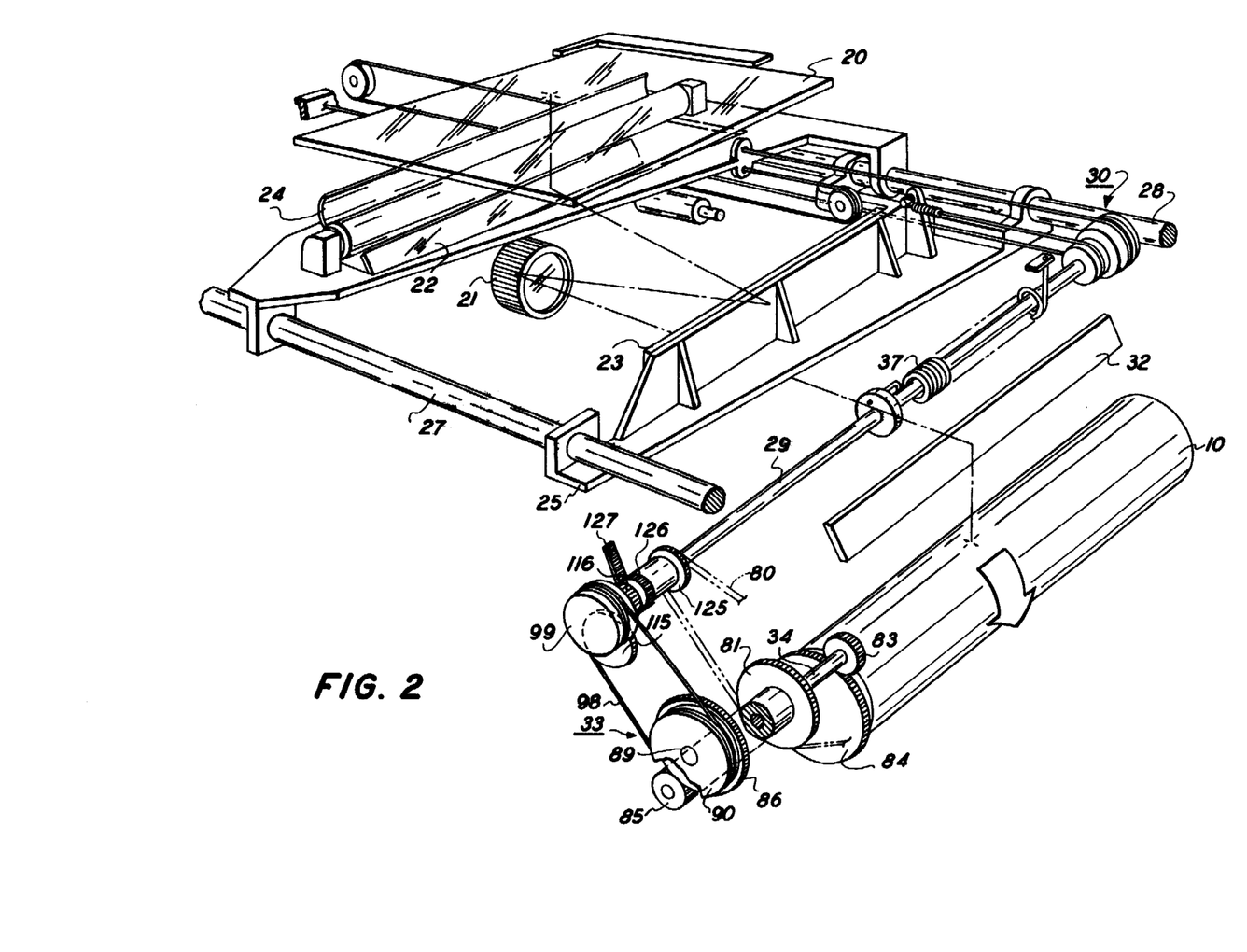
FIG. 2 is a partial perspective view of the stationary viewing platen of the automatic copying machine illustrated in FIG. 1 showing the moving optical scanning system and the drive mechanism associated therewith.

Normally, when the copier is operated in a conventional mode, the original document to be reproduced is placed image side down upon a horizontal transparent viewing platen 20 and the stationary original then scanned by means of a moving optical system of the type illustrated in FIG. 2. The scanning system fundamentally consists of a stationary lens system 21 positioned below the right hand margin of the platen as viewed in FIG. 1 and a pair of cooperating movable scanning mirrors 22, 23 which are carried upon carriages 24, 25, respectively. The lens is basically a half-lens objective having a reflecting surface at the stop position to simulate a full lens system. The two mirror carriages are slidably supported between a pair of parallel horizontally aligned guide rails 27, 28 and are operatively connected to an optical drive shaft 29 via a cable and drum arrangement, generally referenced 30 in FIG. 2. For a further description and greater details concerning this type of optical scanning system reference is had to copending U.S. application Ser. No. 259,181 filed in the name of Shogren, now U.S. Pat. No. 3,832,057.

The drum and cable mechanism 30 functions to regulate the relative motion of the two mirror carriages with that of the drive shaft 29. In practice, mirror 22, herein referred to as the full rate scan mirror, is caused to move from a home position, directly below the left hand margin of the platen as seen in FIGS. 1 and 2, to an end of scan position below the opposite margin of the platen as illustrated in FIG. 2. The rate of travel of the scan mirror is equal to the peripheral speed of the rotating xerographic drum surface. The second mirror 23 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens element. The lens system comprises an off axis objective capable of collecting the entering light rays from one side of the lens central axis and forming an image of the optical information on the opposite side of the axis. The reflecting surface, positioned at the lens stop position, reverses the entering light rays and redirects the light rays back towards a stationary mirror 25 positioned directly above the drum surface at the exposure station B. In this manner a flowing light image containing the original input scene information is focused upon the charged photoconductive plate. The movement of the mirrors are coordinated with the motion of the drum whereby the flowing light image is recorded on the photoreceptor in a clear, undistorted manner.

The drive input to the optical drive shaft 29 is provided through means of a wire and pulley arrangement 33 clutched to the drive shaft 34 which, in turn, is operatively connected to the xerographic drum via mating gears 83 and 84. A more detailed description of the optical drive input system will be presented below. However, suffice to say at this point, when the cooperating mirrors have moved over their prescribed path of travel from a home position to the end of scan position shown in FIG. 2, thus completing the scanning phase of the copying cycles, the wire and pulley system is declutched from shaft 34 freeing the mirror component from the drive input.

A wind up spring 37 is provided to restore the moving mirrors to a start of scan condition. The spring is connected at one end of the drive shaft 29 and anchored at the opposite end in the machine frame as shown in FIG. 2. As the mirrors are advanced through the scanning phase of the copying cycle, the spring is wound to a fully loaded condition. Upon release of the optical drive shaft at the end of the scanning cycle, the loaded spring is allowed to unwind driving the mirror carriages rapidly toward the home or start of scan position. A dashpot (not shown) is arranged to arrest the minor restoration movement and absorbs the flyback energy of the system.

As can be seen, during normal usage the size of the original that can be copied during each copying cycle is limited to the domain or surface area of the viewing platen. Any parts of the original document lying outside the boundaries of the platen, of course, will not be "seen" by the moving optical system. This particular situation is typical of most compact copying machines utilizing a stationary viewing platen and a moving optical system and represents the particular problem that the instant invention overcomes.

The present compact copying apparatus is provided with a large document copying capability, that is, with the ability to reproduce originals of a size greater than the physical dimensions of the viewing platen. To achieve this end, a document feeder is herein provided that is movable between a first stored position adjacent to the viewing platen and a second operative or large document handling position over the platen surface. Commensurate with the positioning of the feeder assembly over the platen, the moving optical system is locked in a position to view documents as they are advanced through the document feeder and record a flowing light image of the input information upon the moving photoconductive plate surface. Similarly, the various machine components are conditioned to accept the protracted input so that documents that would ordinarily lie outside the normal viewing domain of the scanning optics can be processed and full sized copies thereof produced.

Figure 3:
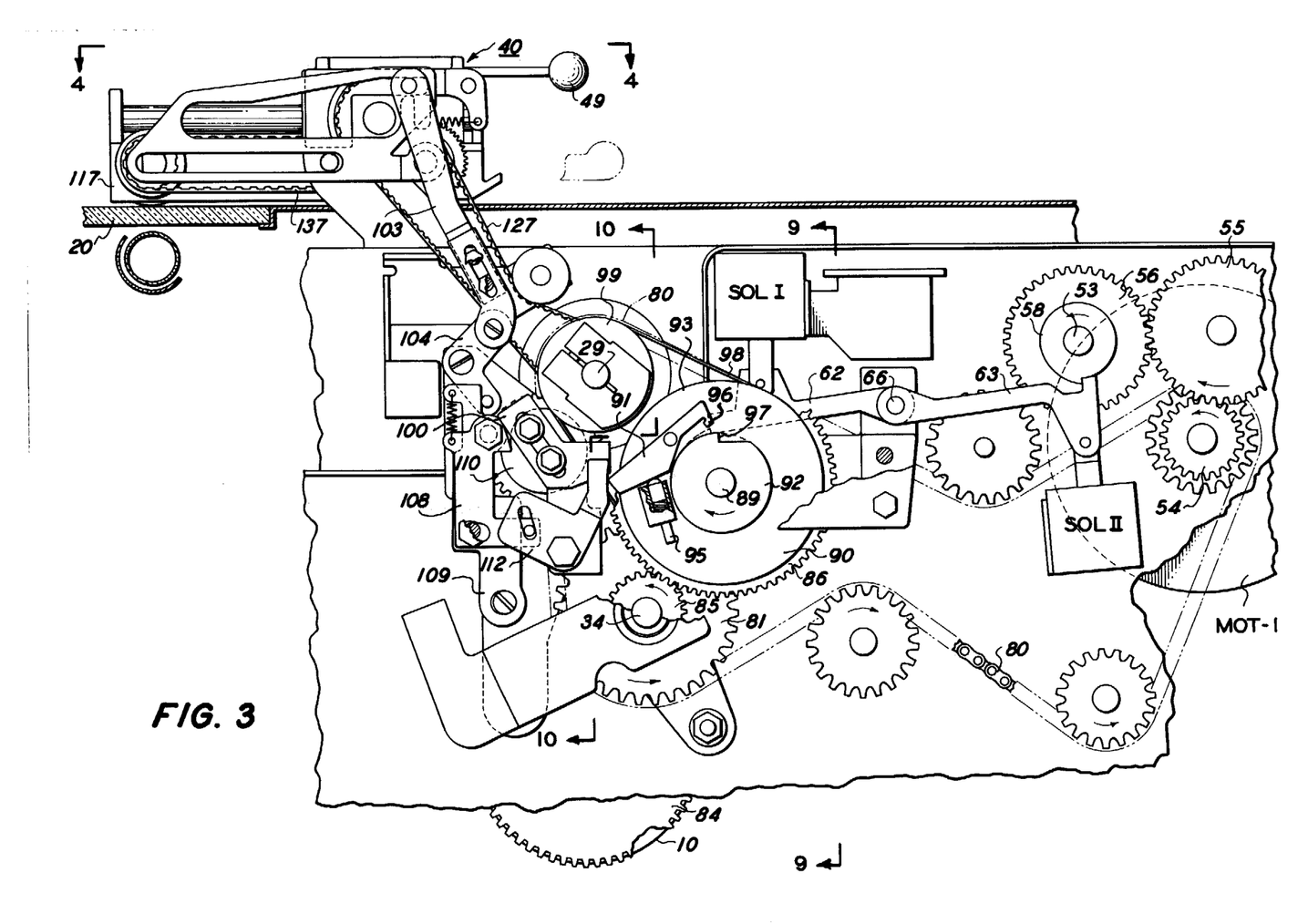
FIG. 3 is a partial view with portions broken away showing the optical drive control mechanism of the automatic compact copier for providing the copier with a large document handling capability.
Figure 4:
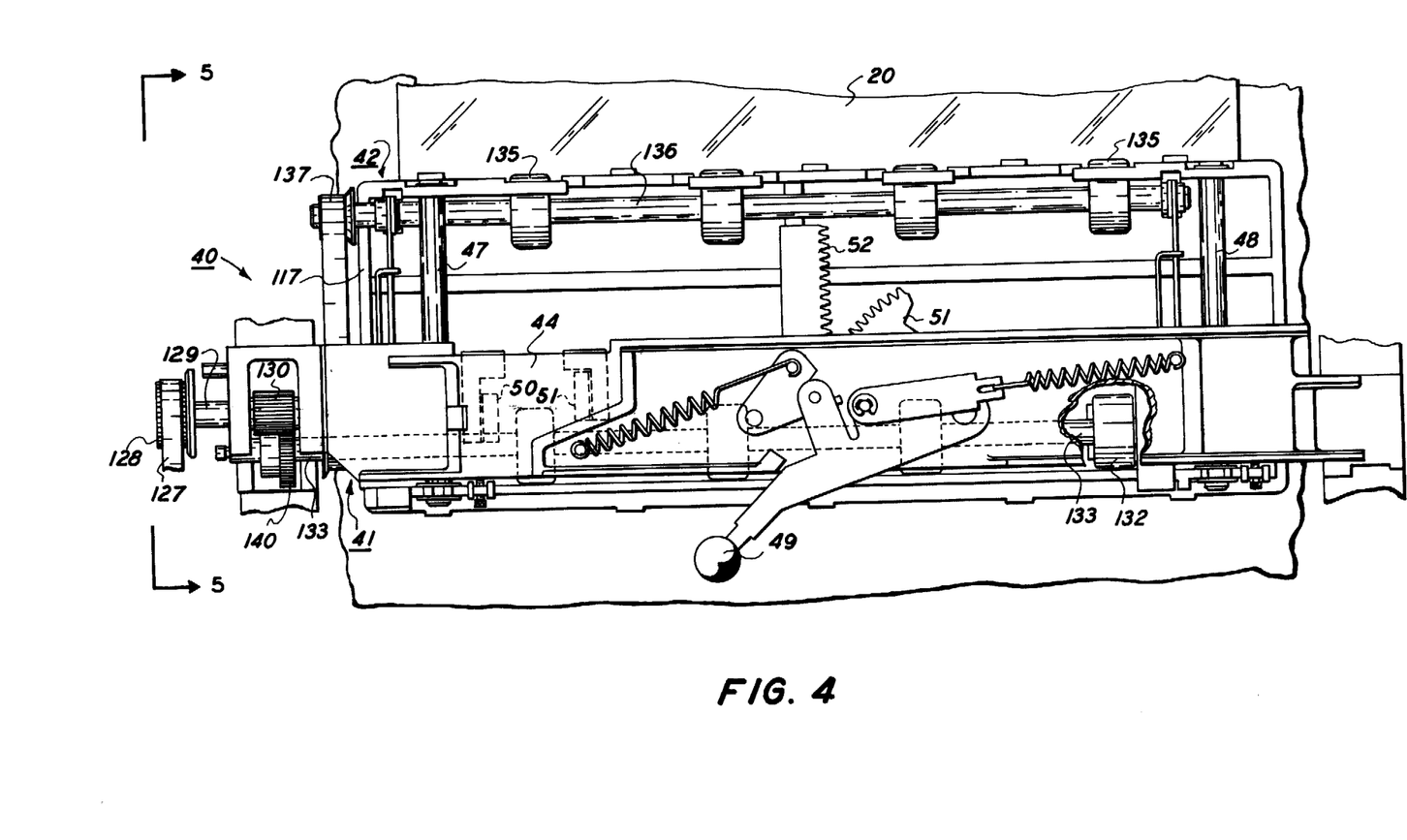
FIG. 4 is an enlarged view taken along lines 4—4 in FIG. 3 showing the movable document feeder assembly associated with the automatic copier with the feeder assembly in an operative position over the viewing platen.
Figure 5:
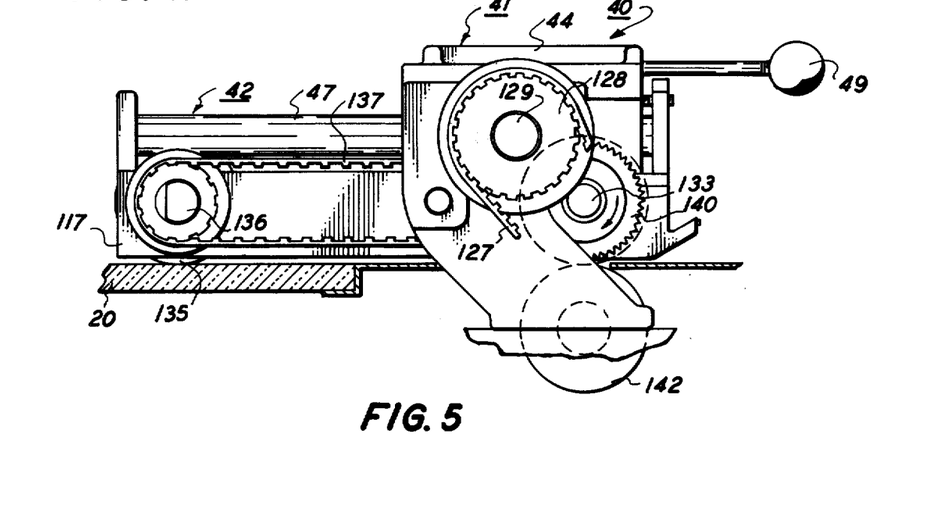
FIG. 5 is an end view of the document feeder assembly illustrated in FIG. 4 showing the document feed rollers and the document hold-down rollers in engagement with the feed roller drive mechanism.

Referring now more specifically to FIGS. 3–5, there is shown the document feeding mechanism 40 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area to the operator.

To initiate the large document mode of operation, the machine operator simply advances the document feeding assembly from the stored position to a document feeding position as illustrated in FIGS. 3–5 with the feeding assembly extending over the left hand margin of the platen surface. Fundamentally, the document feeding mechanism is made up of two main sections which include a stationary support bridge, generally referenced 41, and a movable feed roller support section, generally referenced 42. The bridge 41 is made up of two vertically extending end support members which are securely anchored in the machine frame and upon which is secured a horizontal span 44. The feed roller support section 42 is slidably suspended from a horizontally extended span by means of a pair of parallel aligned rod like guide rails 47, 48 which are slidably supported in bearings (not shown) affixed to the underside of the bridge span. The document feed roll assembly is thus suspended from the span so that it can be freely moved back and forth from the home or stored position adjacent to the platen and an extended position over the left hand margin of the platen surface.

In practice, at the start of the large document handling conversion cycle, the machine operator grasps a lever arm 49 mounted on top of the bridge span and rotates the arm in a clockwise direction as shown in FIG. 4. The lever arm is operatively connected to segmented pinion 51 which meshes with a rack 52 secured to the feed roller assembly 42. Movement of the arm in a clockwise direction causes the movable feed roller assembly to be advanced toward the fully extended or operative position. Rotation of the arm in the opposite direction produces the opposite result.

Manually moving the feed roller support assembly to an extended position also physically closes the contacts of the large document mode switch 52 causing a signal to be sent to the main machine drive motor MOT-1 (FIG. 3) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is therefore no need to feed copy sheets through the copier. In point of fact, feeding a copy sheet during the conversion phase would have a deleterious effect on the various machine components as well as confusing the machine programming and registering system. To prevent this occurrence, a paper feeding clutch 58 (FIG. 3) is herein provided for inhibiting the action of the paper feeder during the period when the machine is being converted to the large document handling mode of operation. As seen in FIG. 3, the drive motor MOT-1 is connected directly to one end of the paper sheet drive shaft 53 via a gear train made up of pinion 54, intermediate gear 55 and a driven gear 56, which is rotatably supported upon the drive shaft is operatively connected to the shaft through a wrap around clutch 58. A chain pulley 59 (FIG. 1) is affixed to the opposite end of the drive shaft 53 and translates the motion of the shaft to feed rollers 15 through a pair of cooperating chain elements 60 and 61.

Figure 6:
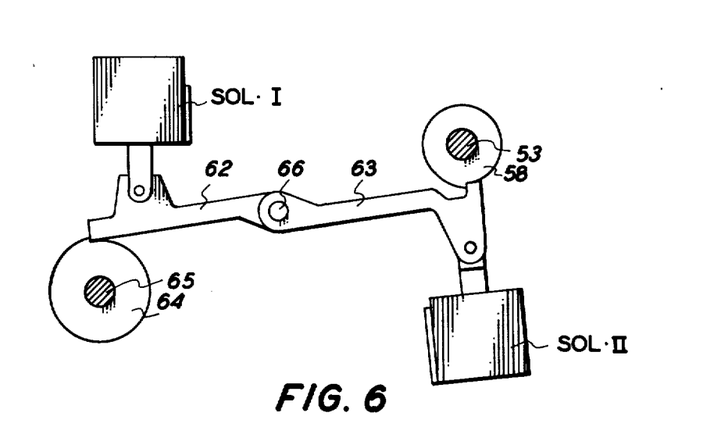
FIGS. 6-8 represent a partial schematic view of the clutching and control mechanism for regulating the paper feed drive associated with the automatic machine illustrated in FIG. 1.

Prior to the initiation of the large document handling mode of operation, a locking bar 62 (FIG. 6) is placed in a holding position against the optics drive clutch 63 and the paper feed drive clutch 59 thus preventing the movement of both the optics input drive shaft 65 and the paper feed drive shaft 53. As can be seen in FIG. 6, the locking bar is pivotably mounted about a pin 66 and is arranged to swing in a counter clockwise direction when solenoid SOL-1 is energized, the energization of which occurs when the document feed roller assembly is moved to an operative position. Upon being energized, the solenoid pulls the left hand end of the bar 62 upwardly to release both the optical input drive shaft and the paper feed input drive shaft. A second locking bar 63 which is also pivotably mounted about the pin 65, is further provided to hold the paper drive clutch 58, and thus paper feed drive shaft 53, inactive while the scanning mirrors are being moved to an end of scan position beneath the extended roll assembly.

Figure 7:
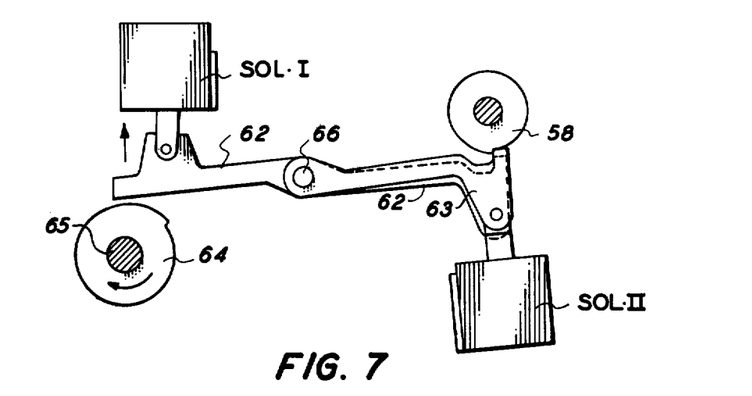
Figure 8:
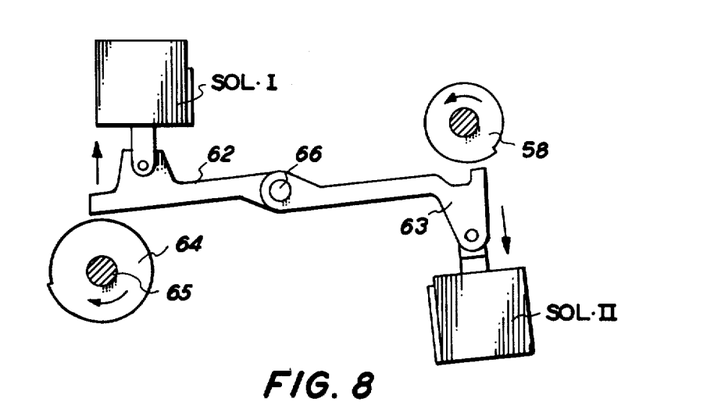

As illustrated in FIG. 7, a second solenoid SOL-2 is operatively attached to the locking bar 63 and serves to hold the paper feeding clutch 58 inactive after the initial release of arm 62. The machine logic, which as noted is programmed at this time to a single copy mode of operation also serves to hold the solenoid SOL-2 inactive for a period of time sufficient to prevent the advancement of a copy sheet from the cassette during this initial conversion period. At the termination of the holding period, solenoid SOL-2 is energized thus pulling back the locking bar 63 to a release position as shown in FIG. 8 thereby conditioning the paper feeder to forward copy sheets through the machine when a large document copying cycle is instituted.

Figure 9:
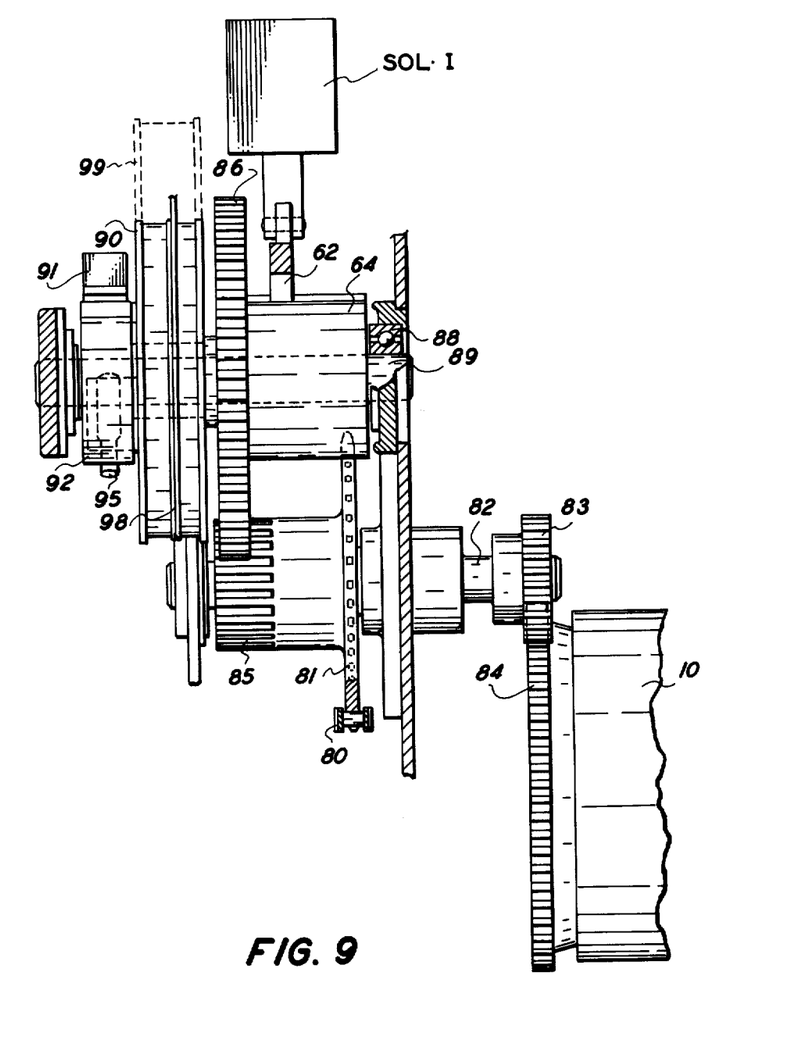
FIG. 9 is a partial enlarged section of the power input to the optical drive system taken along lines 9—9 in FIG. 3.
Figures 12, 13:
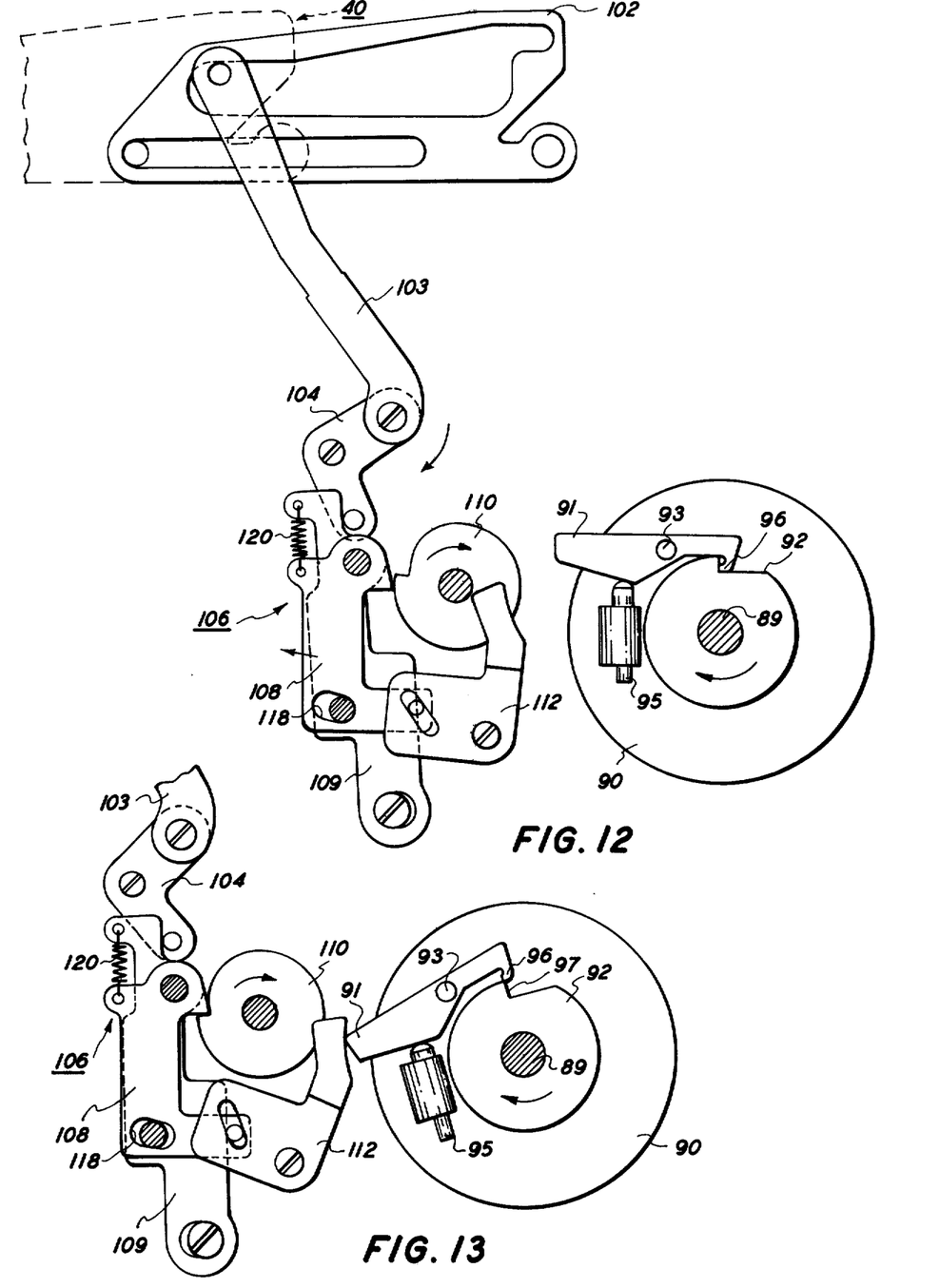
FIG. 12 is a partial enlarged view showing the positioning of the control mechanism associated with the present invention when the document feeding assembly is in a stored condition.
FIG. 13 is a partial view of the mechanism illustrated in FIG. 12 showing the positioning of the control mechanism at the start of the optical lock-out cycle.

The motion of shaft 89, (as seen in FIG. 9) which is generated by engaging clutch 64, is transmitted to a drive pulley 90 via a dog 91 and a dog drive 92. The pulley 90 is rotatably mounted upon shaft 89 so that it can rotate independently about the shaft. The dog drive, on the other hand, is pinned to the shaft, outboard of the pulley 90, and is arranged to turn in unison therewith. The motion of the dog drive is coupled to the pulley by means of the dog element which is staked to the outer face of the pulley by means of the pivot pin 93. As best shown in FIGS. 12 and 13, the pivotably mounted dog is continuously urged in a clockwise direction by a spring loaded biasing member 95 whereby the lip 96 of the dog is forced into latching engagement with a cut out 97 provided in the face of the dog drive.

As illustrated in FIGS. 2 and 3, the pulley 90 has a cable 98 anchored therein which is wound about a second driven pulley 99 secured to the outboard end of the optical drive shaft 29. During normal copying operations, that is, when copies are being made from an original supported on the stationary viewing platen, the optics drive clutch is engaged and the lip of the dog is held within the cut out provided in the dog drive. As a result, the two moving mirrors are coupled to the main machine drive and are advanced forward through the scanning cycle. When the drive pulley 90 has turned from its initial start of scan position through approximately 319° of travel, the extended rear portion of the dog contacts a striker plate 100 (FIG. 3) which forces the lip of the dog out of engagement with the dog drive thus releasing the moving mirrors from the main drive system. At this time, the now loaded spring 37, wound about the optics drive shaft 29, takes over the optical drive function and unwinds to rapidly restore the moving mirror elements to a start of scan position.

The action of the spring 37 is also translated through shafts 29, pulley 99, and cable 98 to the drive pulley 90 so that when the mirror carriages are restored to the start of scan position the pulley and dog arrangement are also returned to their respective start of scan positions. If multiple copies of a single original are to be reproduced, the clutch 64 remains engaged during the entire copying run and the dog and striker arrangement utilized to control the movement of the optics through the required number of scanning passes. Upon the completion of the copy run, the clutch 64 is disengaged and held in a locked position preparatory to the commencement of the next copy run.

During the initial conversion phases to the large document mode of operation, the optics are initially moved across the platen to an end of scan position beneath the extended document feeder assembly where they are locked in place. To achieve this task, a lock out mechanism is herein provided which serves to both uncouple the drive shaft from the main drive system and hold the optics rigidly in a fixed position for viewing large documents subsequently advanced through the document feeding assembly. This lock out feature will be explained in greater detail with reference primarily to FIGS. 1 and 10 through 13.

When the document feeder is placed in a stored position the lock out mechanism assumes the position shown in FIG. 12. A cam 102 is mounted on the moveable feed roller assembly and controls the positioning of the lock out mechanism. Movement of the cam forces follower arm 103 to turn crank 104 in a clockwise direction and a pin 105, secured in the crank, actively engages the lock out control mechanism 106. The lock out mechanism is made up of two members, a latch member 108, and a slide member 109. The latch member is arranged to pivot in and out of latching engagement with a lock out cam 110, (the function of which will be explained below) and the slide member 109 controls the positioning of a pivotably mounted holding link 112. The clockwise movement of the crank 104 causes the latch 108 and the slide 109 to move in the direction indicated sufficiently whereby the lock out cam and the holding link are both freed from engagement with any of the other machine components or, in other words, the lock mechanism is disengaged.

When the document feeder is advanced to an operative of extended position, however, the crank 104 is turned in an opposite direction and the lock out mechanism 106 moved toward a position where latch 108 can engage lock out cam 110 and the slide member 109 allows the holding link 112 to move toward a contacting position with the dog 91 as shown in FIG. 13. The various lock out elements do not assume the lock out position shown in FIG. 13 until after the scanning mirrors have moved from their home or start of scan positions to their fully extended end of scan positions. As noted above, advancement of feed roller assembly engages the main motor drive which in turn cause the mirrors to move through a scanning cycle. However, when the optical drive pulley 90 has turned through about 319° of travel the dog element is disengaged by the striker plate thus freeing the mirrors. The dog, which has been elevated by the striker plate, is prevented by the lock out mechanism from falling back into engagement with the dog drive by the holding action of element 112 which at this time has moved into engagement therewith. This event uncouples the optics drive shaft from the main machine drive system.

Figure 11:
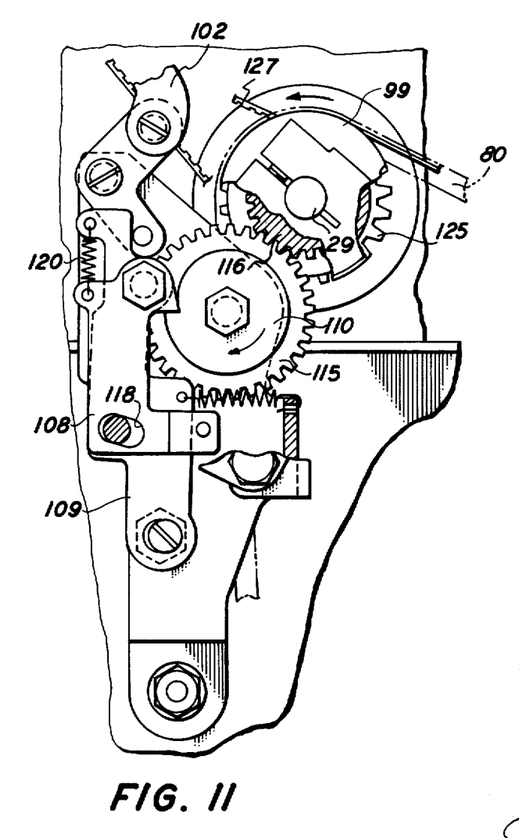
FIG. 11 is a plan view of the lock-out mechanism illustrated in FIG. 10 showing the mechanism for placing the optics drive shaft in a locked position.

As noted above, disengaging the dog normally results in the moving mirrors being rapidly restored to a start of scan position under the driving action of spring 37 (FIG. 2). However, in the large document copying mode of operation, this occurrence is prevented by the second function of the lock out mechanism. This portion of the lock out assembly basically consists of a lock out gear 115 (FIG. 11) mounted upon a stub shaft 116 so that the gear meshes with a second gear 117 pinned to the optical drive shaft 29. The lock out cam 110 called out above, is welded or bolted to the face of the lock out gear 115 so as to turn therewith. When the scanning elements reach the desired end of scan position and the shaft 29 is released from the main drive system, the shaft is prevented from unwinding by the latch 108 falling into engaging the lock out cam in the manner shown in FIG. 11. The force of the loaded return spring 37 is thus exerted through the gears 117, 115 against the holding action of latch 108. Sufficient play, however, is provided in the slide 109 by means of a slotted hole 118 and biasing spring 120 so as to allow the slide to move slightly to the right as shown in FIG. 11 after the initial latching operation is completed. This slight rearrangement of the elements, causes the holding elements to move to the position shown in FIG. 3. As can be seen, this repositioning, although slight, raises the dog drive, which is still being driven in the direction indicated by the main machine drive system will continually clear the dog during subsequent large document copying operations.

Figure 10:
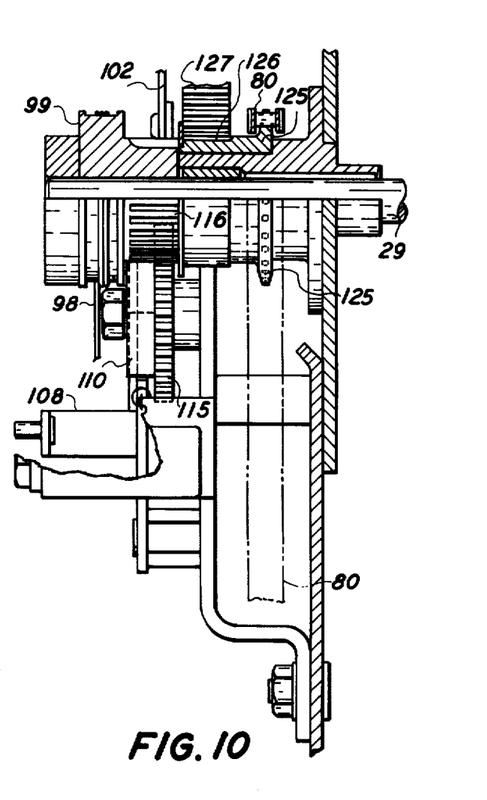
FIG. 10 is an enlarged partial sectional view taken along lines 10—10 in FIG. 3 showing the optical drive lock-out mechanism for positioning the moving optical elements of the scanning system in a fixed position beneath the document feeder.

As seen in FIGS. 3, 10 and 11, the main drive chain 80 is also trained over an idler pulley 125 journaled for rotation about the optics drive shaft 29 whereby the idler pulley is caused to rotate during the periods that the main drive motor MOT-1 is operating. The hub section of sprocket 125 is provided with a belt pulley 126 which serves to drive an endless belt 127. The endless belt, in turn, passes over a driven pulley 128 (FIG. 5) affixed to the outboard end of stub shaft 129 mounted in the bridge section 41 of the document feed roll assembly 40. A gear 130 (FIG. 4) is coaxially mounted on the shaft 129 inboard of sprocket 128. As can be seen in FIGS. 4 and 5, gear 130 is continually rotated through the drive system described above any time that the main drive motor is operative.

The movable document feed roller support section 42 of the document feeder assembly is provided with two sets of co-axially aligned rollers comprising a first set of drive rollers 132 mounted upon shaft 133 and a second set of hold down rollers 135 mounted upon hold down shaft 136. The two roller support shafts are connected by means of a timing belt 137 whereby each set of rollers is adapted to turn in coordination with the other set of rollers. Shaft 133 is arranged to extend beyond the end wall 117 of the movable document feed roll support section 42 and has a gear 140 pinned thereto. In operation gear 140 is adapted to move into and out of meshing contact with the stationary gear 130 as the document feed roll section is moved between a stored and fully extended position. When placed in a fully extended position, as shown in FIGS. 4 and 5, gear 140 meshes with gear 130 thus causing both the document feed rollers 132 and the hold down rollers 135 to be rotated in the direction indicated. Directly below the stationary bridge and adjacent to the platen margin are a set of pinch rollers 142 (FIG. 5) which are rotatably supported in the machine frame. The pinch rollers are arranged in the machine frame so as to coact with the feed rollers 132 when the document feeder is in the operative position so as to advance a document introduced therebetween. In operation, the document is moved past the viewing domain of the now fixed optical assembly and then into the pinch between the hold down rollers and the platen surface. The hold down rollers serve to hold the document in sliding contact with the platen surface as the original is being moved past the optics.

Once the document feeder is advanced to the operative position and the optical system locked in a viewing position therebeneath, a signal is generated indicating that the machine is now in a condition to produce copy from a large document input. To produce such copy, the leading edge of the original is inserted between the cooperating feed rollers and pinch rollers, 132 and 142 respectively, which engage the document in friction driving contact and advance the document along the platen surface past the fixed optical system. As the leading edge of the original document is being advanced over the platen, a sensing switch is made sending a signal to the machine logic which, in turn, conditions the machine to produce a single copy from the original. The cooperating feed rollers are adapted to advance the original over the platen at a rate equal to the peripheral speed of the xerographic drum whereby the original input scene information is recorded on the drum in the manner herein described. The advancement of the sheet continues until such time as the trailing edge of the document clears the above noted switches thus telling the logic system that the document recording operation is completed.

While this invention has been described with reference to the structure disclosed herein, it is not necessarily confined to the details as set forth and this application is intended to cover such modifications or changes as may come within the scope of the following claims.

What is claimed is:

1. In an automatic copying device of the type wherein an original to be reproduced is supported upon a stationary viewing platen and a flowing light image of the original is created by a moving optical scanning device, the improvement comprising, a document feeder for advancing original documents being normally positioned in a stored position adjacent to the viewing platen outside of the viewing domain of the moving optical scanning device, means to move the document feeder from a stored position to an operative position in relation to said platen wherein documents advanced through the feeder are within the viewing domain of said scanning device, means responsive to said last mentioned means to automatically move the optical scanning device to a fixed position relative to said feeder to view an original document advanced therethrough to create a flowing light image of the original in the image plane of the optical device whereby the copier is provided with the capability of reproducing originals of a size larger than normally reproduced.

2. The apparatus of claim 1, further including means to inhibit the production of a copy during the period that the optics are being positioned in relation to the document feeder.

3. The apparatus of claim 2 including means to condition the copier to reproduce a copy of a large original advanced by said feeder past the fixed optics.

4. The apparatus of claim 1 wherein said optics are arranged to record an image of an original upon a moving photosensitive plate.

5. The apparatus of claim 4 wherein the original is advanced by the document feeder at a rate equal to the rate of movement of the photosensitive plate.

6. The apparatus of claim 1 further including coupling means to provide a drive to said document feeder when said feeder is in an operative position and to disengage said drive when said feeder is in the stored position.

7. The apparatus of claim 1 further including a document hold down means associated with said feed to maintain a document advanced therethrough in sliding contact with the viewing platen.

8. Apparatus for providing a compact copying machine with a large document reproducing capability including
- a moving optical scanning device arranged to scan across a stationary original supported upon a viewing platen to record a flowing light image of the original upon a moving photosensitive plate,
- drive means to move the scanning device between a start of scan position and an end of scan position,
- a movably mounted document feeder for advancing originals of a size greater than said viewing platen, said document feeder being movable between a stored position adjacent to the platen and an operative position in relation to said platen whereby documents advanced therethrough are within the viewing domain of the scanning device,
- means responsive to moving said document feeder to an operative position to move the optical scanning device to a location to view documents advanced by said feeder,
- means to decouple said drive means from the optical scanning means when in a document viewing position, and
- locking means operative to hold the decoupled optical scanning means in a fixed viewing position relative to said document feeder whereby a flowing light image of a document advanced thereby is recorded on the moving plate.

9. The apparatus of claim 8 further including means to inhibit the production of copy during the period that the scanning optics are being placed in a fixed position.

10. A reproducing apparatus comprising means for providing a flowing light image of a stationary original supported upon a stationary viewing platen in a first mode of operation and for providing a flowing light image of a moving original in a second mode of operation and means for selecting between said first mode of operation and said second mode of operation, said flowing light image of said stationary original being provided by optical means for scanning said stationary original, said flowing light image of said moving original being provided by means of fixing said optical means at a given position and means for feeding said original over said platen past said fixed optics, said feeding means comprising a document feeder including a feeding member arranged to engage said platen to form a nip therebetween through which said originals are fed when said feeder is in an operative position over said platen and means to move said document feeder from a stored position off said platen to said operative position, whereby documents advanced over the platen by said feeder are within the viewing domain of said optical means.

11. An apparatus as in claim 10 further including means to inhibit the production of a copy during the period that the optics are being positioned at said given position.

12. An apparatus as in claim 10 wherein said optics are arranged to record an image of an original upon a moving photosensitive plate.

13. An apparatus as in claim 12 wherein the original is advanced by the document feeder at a rate equal to the rate of movement of the photosensitive plate.

14. An apparatus as in claim 13 further including coupling means to provide a drive to said document feeder when said feeder is in the operative position and to disengage said drive when said feeder is in the stored position.

15. An apparatus as in claim 14 further including a document holddown means associated with said feeder to maintain a document advanced therethrough in sliding contact with the viewing platen.

16. An apparatus as in claim 10 further including means to condition said apparatus to reproduce a copy of an original which is larger than said platen and which is being advanced by said feeder.

* * * * *

UNITED STATES PATENT AND TRADEMARK OFFICE
CERTIFICATE OF CORRECTION

PATENT NO. : 3,900,258
DATED : August 19, 1975
INVENTOR(S) : Werner F. Hoppner and David K. Shogren It is certified that error appears in the above-identified patent and that said Letters Patent are hereby corrected as shown below:

In Claim 7, line 2, delete "feed" and insert --feeder--.

In Claim 10, line 11, delete "of" and insert --for--; in line 13, delete "optics" and insert --optical means--; in line 14, following "comprising" insert --a cooperating feeding member positioned adjacent said platen and--; in line 15, following "a" insert --first feeding member arranged to engage said cooperating feeding member to form a nip therebetween through which said originals are fed when said feeder is in an operative position over said platen and a second--; in line 17, delete "an" and insert --said--, and delete "over"; and in line 18, delete "said platen".

In Claim 11, line 3, delete "optics" and insert --optical means--

In Claim 12, line 1, delete "optics" and insert --optical means--

Signed and Sealed this sixth Day of April 1976

[SEAL]

Attest:

RUTH C. MASON
*Attesting Officer*

C. MARSHALL DANN
*Commissioner of Patents and Trademarks*